(12) United States Patent
Onaka (10) Patent No.: US 8,606,115 B2
(45) Date of Patent: Dec. 10, 2013

(54) OPTICAL TRANSMISSION APPARATUS AND OPTICAL COMMUNICATION SYSTEM

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 841 days.

(21) Appl. No.: 12/407,521

(22) Filed: Mar. 19, 2009

(65) Prior Publication Data

US 2009/0238569 A1 Sep. 24, 2009

(30) Foreign Application Priority Data

Mar. 19, 2008 (JP) ................. 2008-070747

(51) Int. Cl.
*H04B 17/02* (2006.01)
*H04J 14/02* (2006.01)

(52) U.S. Cl.
USPC ............. 398/194; 398/30; 398/31; 398/181

(58) Field of Classification Search
USPC ................... 398/30, 31, 181, 194
See application file for complete search history.

(56) References Cited

U.S. PATENT DOCUMENTS 7,444,077 B2 * 10/2008 Okuno .................. 398/31
2005/0041968 A1 2/2005 Takahashi

FOREIGN PATENT DOCUMENTS

JP 2000-224116 A 8/2000
JP 2005-072769 3/2005

OTHER PUBLICATIONS

Takeda, M et al., "Active Gain-Tilt Equalization by Preferentially 1.43", *10th Optical Amplifiers and Their Applications ThA3-1, 1999* Jun. 9-11, 1999, p. 76-79.
"Japanese Office Action" mailed by JPO and corresponding to Japanese application No. 2008-070747 on Jan. 26, 2010, with English translation.

* cited by examiner

*Primary Examiner* — Jessica Stultz
*Assistant Examiner* — Michael Carter
(74) *Attorney, Agent, or Firm* — Fujitsu Patent Center (57) ABSTRACT

An optical transmission apparatus is provided with an optical filter on a transmission line between a reception end of a transmission line and an OSC receiver. The optical filter has transmission characteristics such as to pass main signal light and optical supervisory channel light (OSC light), and to cut off noise light contained in at least one end portion band on a short wavelength side and a long wavelength side of an OSC transmission band used for reception of OSC light. By such a configuration, even in a case where the OSC light is Raman amplified and transmitted, the influence of noise light due to Raman amplification can be reduced, and OSC light can be received reliably, enabling high dependability to be realized.

12 Claims, 11 Drawing Sheets

FIRST EMBODIMENT

FIG.4

CONVENTIONAL CONFIGURATION

RELATED ART

FIG.12

RELATED ART

FIG.14

RELATED ART

OPTICAL TRANSMISSION APPARATUS AND OPTICAL COMMUNICATION SYSTEM

CROSS-REFERENCE TO RELATED APPLICATION

This application is based upon and claims the benefit of priority of the prior Japanese Patent Application No. 2008-070747, filed on Mar. 19, 2008, the entire contents of which are incorporated herein by reference.

FIELD

The present invention relates to an optical transmissions apparatus and an optical communication system furnished with a function for transmitting system information using optical supervisory channel light different to the main signal light, and in particular relates to transmission technology for optical supervisory channel light to correspond to an increase in the long distance of repeating sections.

BACKGROUND

As a background for the recent increase in communication traffic, the demand for optical communication/transmission apparatuses is increasing. Not only for optical repeating nodes introduced with backbone networks, but also recently, the introduction of optical transmission apparatuses for local networks is being actively performed. Furthermore, optical networks are also being formed for subscriber loops. In this manner, optical communication systems bear an important role with respect to world information networks. Therefore, naturally, high dependability is required for optical communication systems.

Figure 11:
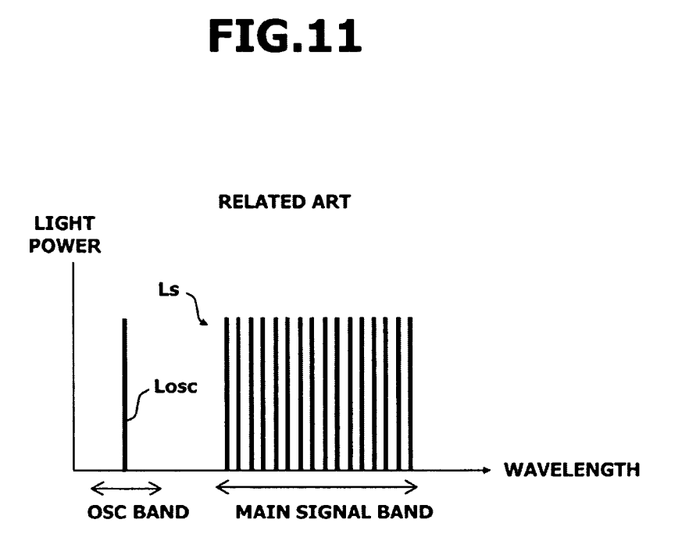
FIG. 11 is a diagram illustrating an example of a wavelength arrangement of main signal light and OSC light in a conventional optical communication system.

As an important means for maintaining high dependability of optical communication systems, there is an information transmission function using optical supervisory channel (OSC). The OSC light is transmitted on a transmission line together with an optical communication signal (main signal light), and by transmitting operation information or performance information for an optical communication system to various parts in the optical communication system, maintenance of the transmission characteristics and smooth handling in the event of problems are realized. In conventional optical communication systems, normally, as illustrated in FIG. 11, OSC light Losc is arranged in a wavelength band separated from a wavelength band where a plurality of main signal lights Ls of different wavelength are arranged.

Figure 12:
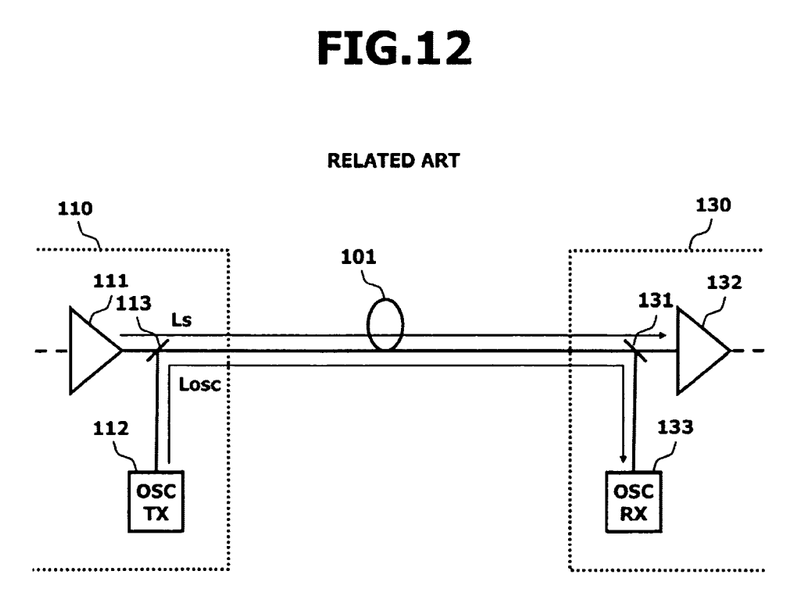
FIG. 12 is a block diagram illustrating an example of a general system configuration for transmitting and receiving OSC light between optical transmission apparatuses.

As a general system configuration for transmitting and receiving such OSC light Losc between optical transmission apparatuses, a configuration for example as illustrated in FIG. 12 is well known, where in a transmission side optical transmission apparatus 110, the OSC light Losc generated by an OSC transmitter 112 passes through a multiplexing filter 113 provided on the output side of a main signal optical amplifier 111 and is multiplexed with the main signal light Ls and transmitted to a transmission line 101, and the OSC light Losc transmitted to the transmission line 101, is separated in a reception side optical transmission apparatus 130, from the main signal light Ls by a demultiplexer 131 provided on the input side of a main signal optical amplifier 132, and received by an OSC receiver 133.

In the above optical communication system which uses OSC light, if the repeating distance between the optical transmission apparatuses becomes long, the losses of the transmission line increase. More specifically, the loss per unit length of the transmission line is generally around 0.2 dB/km, and the loss of the transmission line for one repeating section increases corresponding to the repeating distance. Furthermore, in the case where various functional optical components are arranged on the transmission line, the transmission losses of these functional optical components add up so that the repeating losses become even greater. Therefore, as the light level of the transmission light reaching the reception side becomes smaller, the transmission characteristics deteriorate, so that there is a likelihood of an increase in the number of reception errors per unit time. In particular, for the aforementioned OSC light arranged in the wavelength band as illustrated in FIG. 11, the loss of the transmission line is greater than for the main signal light. Furthermore, since this also receives an influence from the Raman effect of the main signal light existing on the long wavelength side, a decrease in the light level after transmission is likely to occur.

Figure 13:
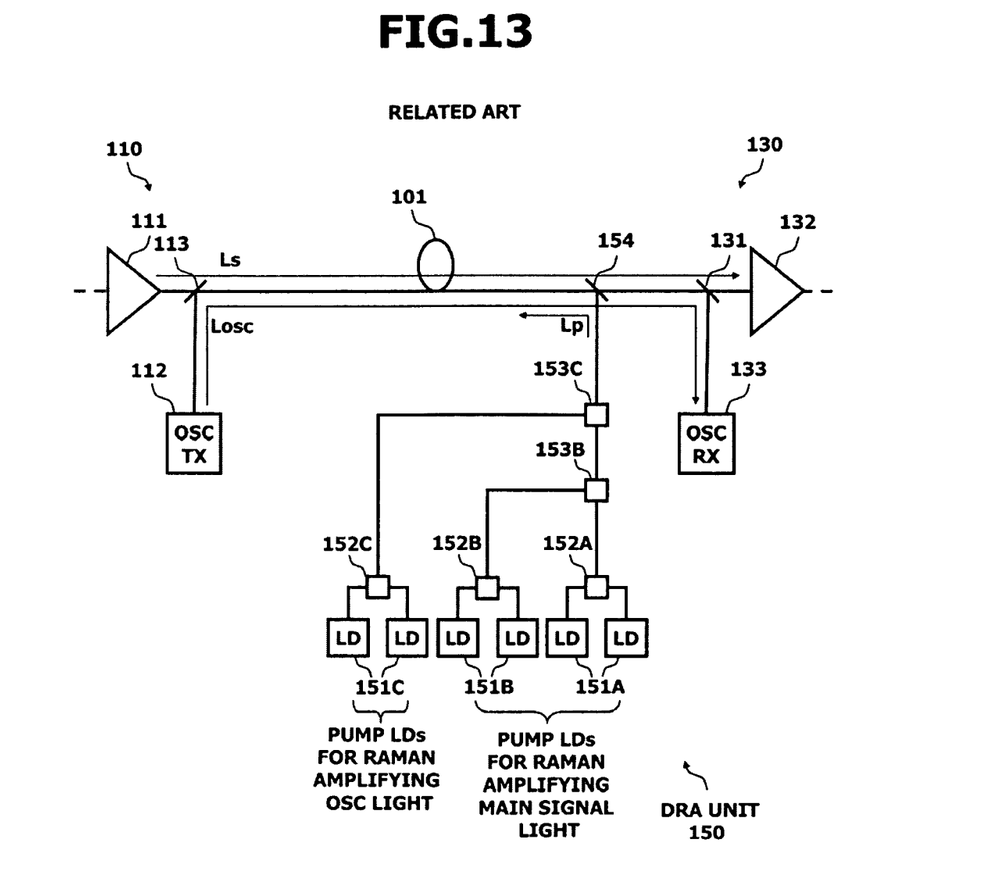
FIG. 13 is a block diagram illustrating a configuration example of a conventional optical communication system in which a DRA unit is applied to perform amplification of main signal light and OSC light.

In order to avoid the aforementioned transmission characteristic deterioration accompanying the increase in the long distance of the repeating section, then for the main signal light Ls, in the configuration of FIG. 12, this can be dealt with by increasing the gain (optical output power) of the main signal optical amplifier 111 on the transmission side. Furthermore, even when coping in this way, in the case where the light level of the main signal light Ls after transmission is insufficient, it is also effective to apply transmission line distributed Raman amplification (DRA) such as known from the document; M. Takeda et al., "Active Gain-Tilt Equalization by Preferentially 1.43 µm- or 1.48 µm-Pumped Raman Amplification", OAA '99, ThA 3-1, 1999, and add a DRA unit 150 for example as illustrated in FIG. 13, that supplies pump light Lp to the transmission line 101, and then Raman amplify the transmission light using the amplification effect due to the induced Raman scattering effect. In this case, in the DRA unit 150, by providing a configuration for Raman amplifying the OSC light Losc (pump light sources (LD) 151C, multiplexers 152C and 153C) in addition to a configuration for Raman amplifying the main signal light Ls (pump light sources (LD) 151A and 151B, multiplexers 152A, 152B, 153B, and 154), it is possible to suppress a drop in the reception level not only of the main signal light Ls but also of the OSC light Losc.

Incidentally, in the above described optical communication system to which is applied the main signal light optical amplifier or the optical amplifying device such as a DRA unit, unnecessary noise light other than the main signal light Ls and the OSC light Losc is generated in the optical amplifying device. Furthermore, when the optical amplifying device is connected in multi-stages, the above noise light accumulates, and hence the power of the noise light reaching the reception end becomes large, so that there is a problem in that the transmission characteristics of the main signal light Ls and the OSC light Losc are deteriorated.

As a conventional technique for reducing the influence of the noise light generated by the optical amplifying device as mentioned above, for example as illustrated in FIG. 14, there is proposed a configuration where an optical circulator 202 and a fiber Bragg grating 203 that reflects the OSC light Losc, are provided on the input end of an optical fiber amplifier 201, and the OSC light Losc that is reflected by the fiber Bragg grating 203 and taken out by the optical circulator 202 is received by an OSC receiver 205 via an optical filter 204, and in the optical filter 204, spontaneous emission light that is generated by the optical fiber amplifier 201 such as an EDFA and propagated in an opposite direction to the main signal light Ls is cut off (refer for example to Japanese Laid-open Patent Publication No. 2000-224116).

Figure 14:
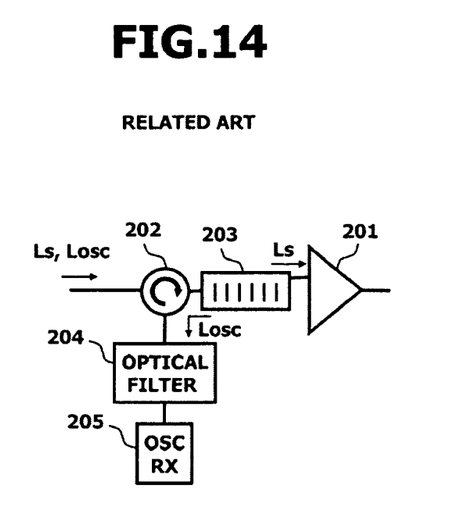
FIG. 14 is a diagram illustrating an example of a conventional technique for reducing the influence of noise light generated by an optical amplifying device.

However, in the above conventional configuration as illustrated in FIG. 14, while this reduces the influence of the opposite direction spontaneous emission light (noise light) from the optical fiber amplifier 201 on the OSC light received by the OSC receiver 205, there is a problem in that the influence of the noise light propagating in the same direction as the main signal light and the OSC light, generated on the upstream side from the optical fiber amplifier 201 is not reduced. That is to say, the spontaneous emission light that is cut off by the optical filter 204 is light that has passed through the fiber Bragg grating 203, and hence the wavelength band is different to the wavelength band of the OSC light. Therefore, regarding the noise light that is generated on the upstream side from the optical fiber amplifier 201, the wavelength component corresponding to the wavelength band of the OSC light is reflected by the fiber Bragg grating 203, and passes through the optical circulator 202 and the optical filter 204, and is input to the OSC receiver 205, so that the reception characteristics of the OSC light are deteriorated. In particular, in a system to which Raman amplification of OSC light is applied, the noise light generated in the Raman amplification is added to the spontaneous emission light generated in the optical fiber amplifier on the upstream side. Therefore regarding the input light to the OSC receiver 205, the proportion of the OSC light power with respect to the noise light power becomes small, so that there is a possibility that the count of reception errors per unit time increases.

SUMMARY

According to one aspect of the optical transmission apparatus is that in a configuration including; a demultiplexing section, an optical supervisory channel light receiving section and a noise light cutoff section. As for the demultiplexing section, a light output from a reception end of a transmission line that propagates main signal light and optical supervisory channel light that is different from the main signal light while Raman amplifying each of these, is input. The demultiplexing section has a predetermined transmission band centered on a wavelength of the optical supervisory channel light, and demultiplexes the optical supervisory channel light from the input light in accordance with the transmission band. The optical supervisory channel light receiving section receives the optical supervisory channel light that has been demultiplexed by the de multiplexing section. The noise light cutoff section is arranged on an optical path between the reception end of the transmission line and the optical supervisory channel light receiving section. The noise light cutoff section passes the main signal light and the optical supervisory channel light, and cuts off noise light included in at least one end portion band on a short wavelength side and a long wavelength side of the transmission band, out of the noise light corresponding to the transmission band of the demultiplexing section.

In the optical transmission apparatus with such a configuration, the noise light generated due to Raman amplification in the transmission line is input to the demultiplexing section together with the main signal light and the optical supervisory channel light, and in the demultiplexing section, is demultiplexed into optical supervisory channel light that includes noise light, and sent to the optical supervisory channel light receiving section. At this time, by cutting off with the noise light cutoff section, the noise light included in the end portion band on the short wavelength side or in the end portion band on the long wavelength side of the transmission band of the demultiplexing section centered on the wavelength of the optical supervisory channel light, the power of the noise light input to the optical supervisory channel light receiving section together with the optical supervisory channel light is reduced.

According to the optical transmission apparatus as described above, even in the case where due to the increase in the repeating losses due to an increase in the long distance of the repeating section, the main signal light and the optical supervisory channel light need to be Raman amplified and transmitted, the influence of the noise light due to Raman amplification is reduced by the noise light cutoff section. Therefore the optical supervisory channel light can be reliably received, so that high dependability can be realized.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Hereunder is a description of embodiments for carrying out the invention, with reference to the appended drawings.

Throughout all the figures, the same reference symbols denote the same or equivalent parts.

Figure 1:
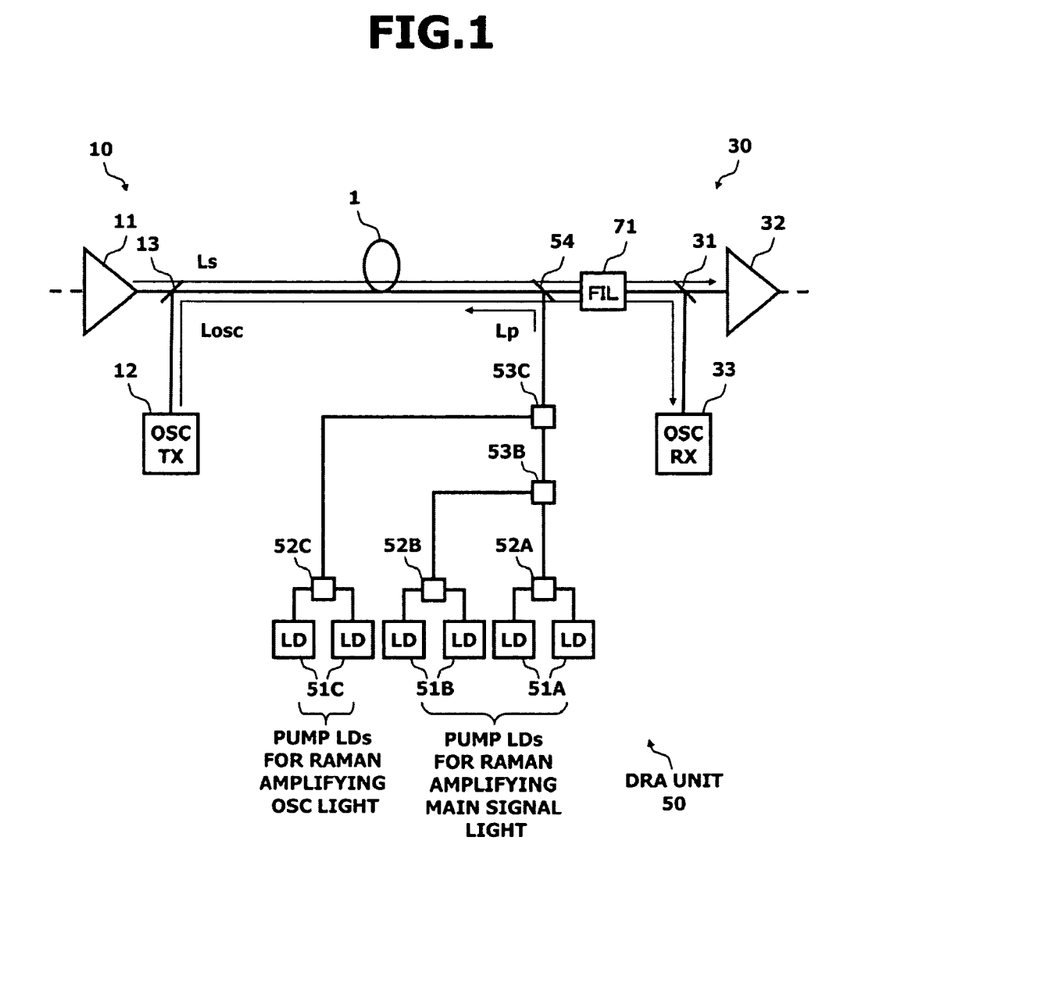
FIG. 1 is a block diagram showing a configuration of a first embodiment of an optical communication system.

FIG. 1 is a block diagram showing a configuration of a first embodiment of an optical communication system. This FIG. 1 shows a configuration example for transmitting and receiving main signal light and OSC light in a single repeating section of the optical communication system. The same configuration as this is respectively provided in each repeating section on the optical communication system.

Furthermore, regarding the wavelength arrangement of the main signal light and the OSC light in the optical communication system, similar to the aforementioned case shown in FIG. 11, the OSC light Losc is arranged in a wavelength band separated from the wavelength band in which the plurality of main signal lights Ls of different wavelengths are arranged. Here, as a specific example, the description is made with respect to the main signal light Ls of the C-band (1530 to 1560 nm), assuming the case where OSC light Losc of one wavelength is arranged in the vicinity of 1510 nm. However, the wavelength arrangement of OSC light in this invention is not limited to the above specific example, and for example it is also possible to arrange the OSC light in a wavelength band separated on the long wavelength side with respect to the main signal light of the C-band. Moreover, the wavelength band of the main signal light may be outside of the C-band.

In the single repeating section shown in FIG. 1, the device connected to the left side of the transmission line 1 is an optical transmission apparatus 10 on the transmission side, while the device connected to the right side of the transmission line 1 is an optical transmission apparatus 30 on the reception side. The transmission side optical transmission apparatus 10 has a main signal optical amplifier 11 for amplifying the main signal light Ls up to a necessary level using a known optical amplifying device such as for example an erbium doped optical fiber amplifier (EDFA). The output port of the main signal optical amplifier 11 is connected to a transmission end of the transmission line 1. On the optical path between the output port of the main signal optical amplifier 11 and the transmission end of the transmission line 1, there is provided a multiplexer (optical filter) 13 for combining the output light from the main signal optical amplifier 11 and the OSC light Losc output from an OSC transmitter (OSCTX) 12, and outputting this to the transmission line 1.

The optical transmission apparatus 30 on the reception side comprises for example: a demultiplexer 31 that demultiplexes the light transmitted on the transmission line 1 into main signal light Ls and OSC light Losc; a known main signal optical amplifier 32 such as an EDFA for amplifying the main signal light Ls demultiplexed by the demultiplexer 31 up to a necessary level; an OSC receiver (OSCRX) 33 for receiving the OSC light Losc demultiplexed by the demultiplexer 31; and an optical filter (FIL) 71 serving as a noise light cutoff section provided on an optical path between a reception end (main signal light output end) of the transmission line 1 and the demultiplexer 31. Furthermore, a DRA unit 50 is connected to the reception end of the transmission line 1.

Figure 2:
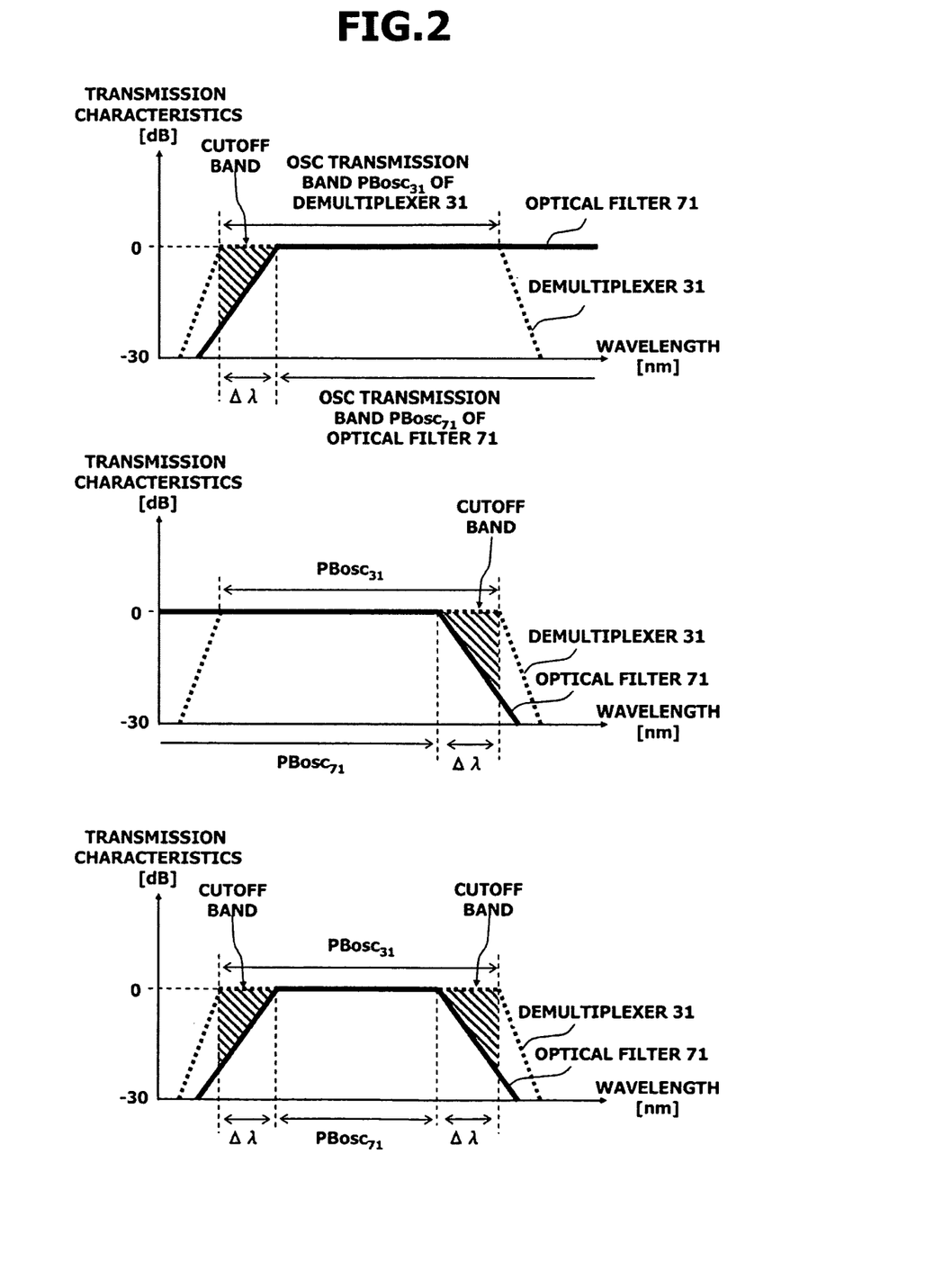
FIG. 2 is a diagram schematically showing a relationship between transmission bands of a demultiplexer and an optical filter in the first embodiment.

The optical filter 71 has a filter characteristic for passing the main signal light Ls and the OSC light Losc, and cutting off noise light out of the noise light corresponding to the transmission band centered on the wavelength of the OSC light in the demultiplexer 31, that contains at least one end portion band on the short wavelength side and the long wavelength side of the transmission band. FIG. 2 schematically shows the relationship between the transmission band corresponding to the OSC light Losc of the optical filter 71 and the transmission band corresponding to the OSC light Losc of the demultiplexer 31. The filter characteristics shown at the top of FIG. 2 are an example of where the OSC transmission band $PBosc_{71}$ of the optical filter 71 is set so that the end portion on the short wavelength side with respect to the OSC transmission band $PBosc_{31}$ of the demultiplexer 31, becomes the cutoff band (shaded portion). Furthermore, the filter characteristics shown at the middle of FIG. 2 are an example for where the OSC transmission band $PBosc_{71}$ of the optical filter 71 is set so that the end portion on the long wavelength side with respect to the OSC transmission band $PBosc_{31}$ of the demultiplexer 31, becomes the cutoff band (shaded portion). Moreover, the filter characteristics shown at the bottom of FIG. 2 are an example for where the OSC transmission band $PBosc_{71}$ of the optical filter 71 is set so that the end portions on both the short wavelength side and the long wavelength side with respect to the OSC transmission band $PBosc_{31}$ of the demultiplexer 31, become the cutoff bands (shaded portions). In the respective setting examples, the wavelength width $\Delta\lambda$ of the cutoff band on the short wavelength side or the long wavelength side corresponds to the reception characteristics of the OSC receiver 33, and is previously designed so that the reception of the OSC light Losc is performed at a desired error rate or less.

In the example of FIG. 2, the transmission characteristics of the optical filter 71 are simply represented with a line shape. However actually these may be a shape such as a Gaussian-type or a Lorentz-type depending on the device that is used in the optical filter 71. As the filter device, for example there is an etalon, a dielectric multilayer, a fiber grating, and the like.

Furthermore, concerning which one of the three filter characteristics illustrated in FIG. 2 to select, then in relation to the transmission characteristics of the optical filter 71, rather than the complex transmission characteristics as with the band pass filter shown at the bottom of FIG. 2, the transmission characteristics as with the high pass filter shown at the top of FIG. 2 or the low pass filter shown at the middle of FIG. 2 have an advantage from the view point that the element configurations of the optical filter 71 can be simplified, and hence the apparatus can be made in a small space, construction can be simplified, and these can be low cost. Furthermore, in relation to which end portion on the short wavelength side and the long wavelength side to make the cutoff band, it is efficient to make the side where the total power of the noise light in a unit wavelength band is a maximum as the cutoff band. For example, with the central wavelength of the OSC transmission band $PBosc_{31}$ of the demultiplexer 31 as a baseline, in the case where the Raman noise light total power in the unit wavelength band is greater on the long wavelength side than on the short wavelength side, the cutoff band in the optical filter 71 is preferably made the end portion on the long wavelength side (in the middle in FIG. 2). However, in the case where there is no particular restriction in relation to space and cost and so forth, then rather than making only one end portion on either of the short wavelength side and the long wavelength side the cutoff band, it is more efficient to make both end portions as the cutoff band.

The DRA unit 50 (FIG. 1) has: a plurality of pump light sources (LD) 51A and 51B that generate pump light of a wavelength capable of Raman amplifying the main signal light Ls; a plurality of pump light sources 51C that generate pump light of a wavelength capable of Raman amplifying the OSC light Losc; multiplexers 52A, 52B, 52C, 53B, and 53C for multiplexing output light of the respective pump light sources 51A to 51C into one; and a multiplexer 54 for sending the pump light Lp multiplexed by the multiplexer 53C to the transmission line 1. By means of the pump light Lp supplied from the multiplexer 54 to the transmission line 1, the main signal light Ls and the OSC light Losc propagated on the transmission line 1 are respectively Raman amplified. Here an example is shown where Raman amplification is performed with the whole of the transmission line 1 serving an optical amplification medium. However for example the present invention is also effective for a system where centralized Raman amplification of the main signal light Ls and the OSC light Losc is performed with a dispersion compensated fiber or the like (not shown in the figure) arranged on the optical transmission line, and serving as an optical amplification medium.

In the one repeating section of the optical communication system provided with the above described configuration, the main signal light Ls amplified by the main signal optical amplifier 11 of the optical transmission apparatus 10 on the transmission side, and the OSC light Losc output from the OSC transmitter 12 are multiplexed in the multiplexer 13 and sent to the transmission line 1. The pump light Lp from the DRA unit 50 is supplied to the transmission line 1, and the main signal light Ls and the OSC light Losc that are Raman amplified by propagating through the transmission line 1 are input to the optical transmission apparatus 30 on the reception side. In the input light to the optical transmission apparatus 30 on the reception side, noise light other than the main signal light Ls and the OSC light Losc, includes not only spontaneous emission (ASE) light generated in the main signal optical amplifier 11 on the transmission side, but also noise light generated due to the Raman amplification in the transmission line 1. This noise light is distributed over a wide wavelength band including that of the main signal light Ls and the OSC light Losc as shown for example in FIG. 3.

Figure 4:
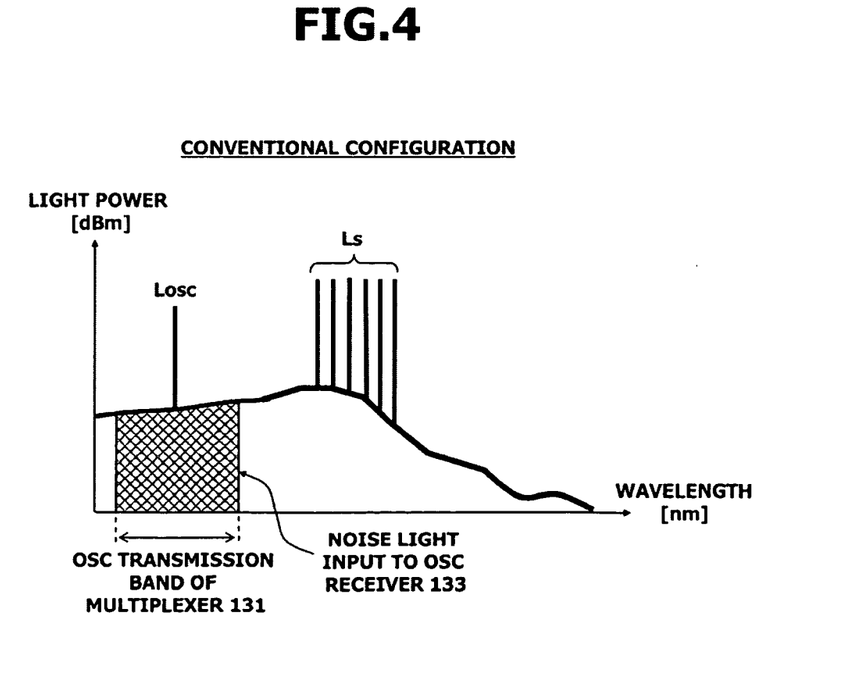
FIG. 4 is a diagram illustrating noise light that is input to an OSC receiver in a conventional configuration.

Here, considering the aforementioned conventional system configuration as shown in FIG. 13, the input light to the optical transmission apparatus 130 on the reception side does not pass through an optical filter 71 as with this embodiment, but is applied to the demultiplexer 131 and demultiplexed into the main signal light Ls and the OSC light Losc. Therefore, as illustrated by the mesh portion of FIG. 4, the OSC light Losc that includes the noise light corresponding to the OSC transmission band of the demultiplexer 131 is input to the OSC receiver 133.

Figure 3:
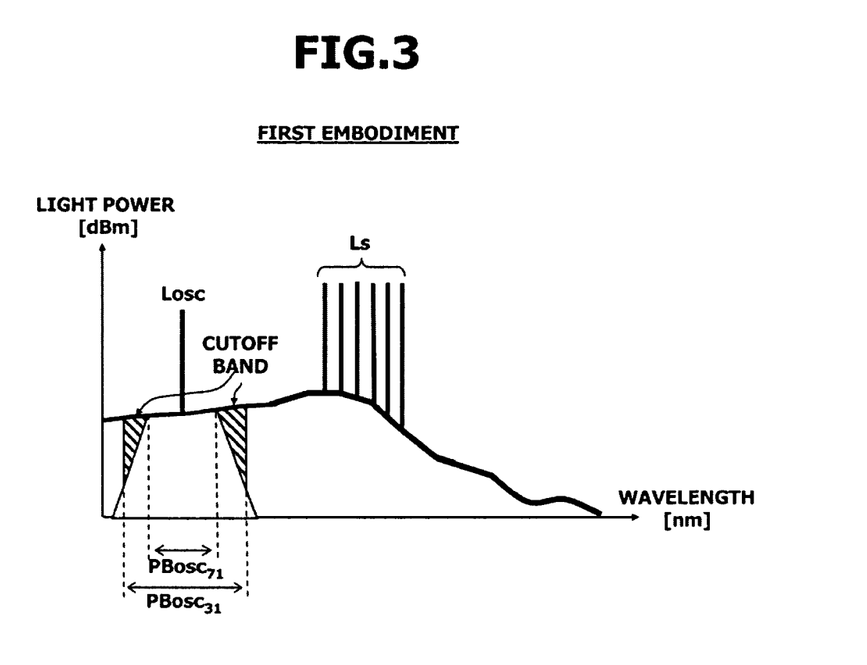
FIG. 3 is a diagram showing an example of noise light that is cutoff by an optical filter in the first embodiment.

On the other hand, in the configuration of the present embodiment, for example in the case where the optical filter 71 having the OSC transmission band $PBosc_{71}$ as shown at the bottom of FIG. 2 is applied, then out of the noise light input to the OSC receiver in the conventional configuration, the noise light corresponding to the hatched portion of FIG. 3 is cut off by the optical filter 71. Therefore the total power of the noise light input to the OSC receiver 33 is reduced, and the reception characteristics of the OSC light Losc are improved.

As the photodetector (not shown in the figure) used in the OSC receiver 33, an avalanche photodiode (APD) is suitable. By applying an APD to the OSC receiver 33, OSC light Losc with a smaller input level can be received, so that the reception characteristics of the OSC light Losc can be further improved by the multiplier effect of the noise light cutoff by the optical filter 71. Therefore it is also possible to correspond to an optical transmission system with even greater repeating losses.

Here is a detailed description of the cutoff band for the noise light by the optical filter 71.

The OSC light Losc used in a general optical communication system is basically one wave. However in the laser light source that generates the OSC light Losc, there are temperature characteristics that are determined for example from individual variations of the emission wavelength or from the semiconductor materials. Therefore, for the OSC transmission band $PBosc_{71}$ of the optical filter 71, it is preferable to give this a necessary width centered on the design wavelength of the OSC light Losc. More specifically, it is desirable that a width of the order of 10 nm is provided. On the other hand, regarding the OSC transmission band $PBosc_{31}$ of the demultiplexer 31, a problem occurs in that if this is made a narrow band more than necessary the cost is increased, and the yield deteriorates. Therefore, often this is generally designed to the order of 25 nm. Consequently, the wavelength band which is exclusion of the wavelength band of the OSC light Losc from the OSC transmission band $PBosc_{31}$ of the demultiplexer 31, becomes the cut off object of the noise light by the optical filter 71.

In relation to the wavelength band of the OSC light Losc described as being desirable to have a width of the order of 10 nm as mentioned above, for example by performing component selection from amongst the individual variations of the emission wavelengths it is possible to make a band narrower than 10 nm. If the wavelength band of the OSC light Losc can be specified to a narrower band, then the cut off band of the noise light by the optical filter 71 can be designed to be wider. Therefore it is possible to effectively improve the reception characteristics of the OSC light Losc.

In the present invention as described above, design of the cutoff band of the noise light in the optical filter 71 is performed with the OSC transmission band $PBosc_{31}$ of the demultiplexer 31 as the baseline. One reason for making the OSC transmission band $PBosc_{31}$ of the demultiplexer 31 as the baseline, is to focus on the point that it is common to use the demultiplexer 31 in common for an optical amplifier repeating system with only an EDFA in which Raman amplification is not applied, and a system that is upgraded by applying Raman amplification to the system. That is to say, there is problem that newly arises due to applying Raman amplification to an existing system, and attention is therefore focused on the point that countermeasures for noise light due to Raman amplification can be easily executed by performing design of the optical filter 71 with the OSC transmission band $PBosc_{31}$ of the demultiplexer 31 as the baseline.

According to the optical communication system of the first embodiment as described above, even in the case where the OSC light Losc is Raman amplified and transmitted, the influence of the noise light due to Raman amplification is reduced by the optical filter 71. Therefore the OSC light Losc can be reliably received, and it is possible to realize high dependability.

Figure 5:
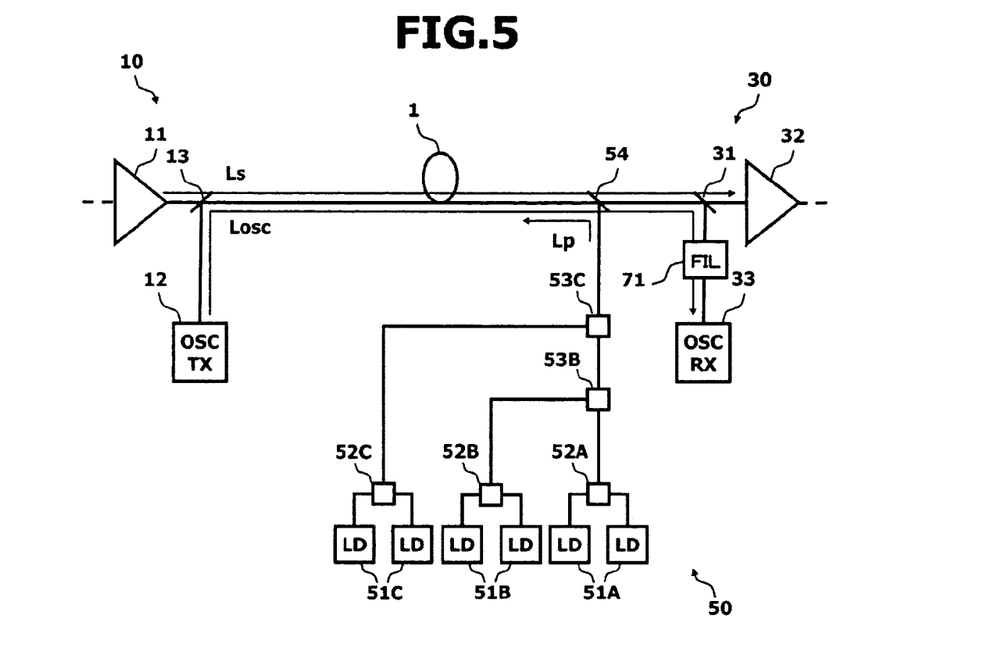
FIG. 5 is a block diagram showing another configuration example related to the first embodiment.

In the above described first embodiment, a configuration example is shown where the optical filter 71 is arranged on the optical path between the reception end of the transmission line 1 and the demultiplexer 31. However even if as shown for example in FIG. 5, the optical filter 71 is arranged on the optical path between the demultiplexer 31 and the OSC receiver 33, similar operation affects to the case of the first embodiment can be obtained. That is to say, the arrangement of the optical filter 71 may be an arbitrary position on the optical path between the reception end of the transmission line 1 and the input end of the OSC receiver 33.

Next is a description of a second embodiment of an optical communication system of the present invention.

Figure 6:
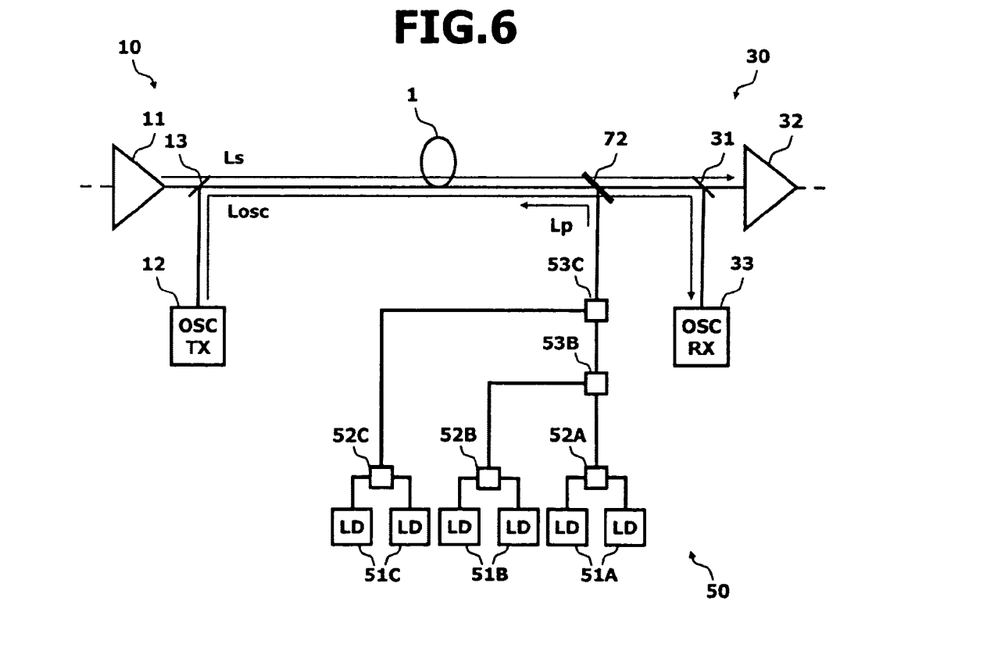
FIG. 6 is a block diagram showing a configuration of a second embodiment of an optical transmission system.

FIG. 6 is a block diagram showing a configuration example of one repeating section in the optical communication system of the second embodiment.

In FIG. 6, the optical communication system of this embodiment is one where, in the configuration of the aforementioned first embodiment shown in FIG. 1, a function equivalent to the optical filter 71 is provided in the multiplexer 54 that applies the Raman amplification pump light Lp to the transmission line 1. In the configuration example of FIG. 6, reference symbol 72 denotes a multiplexer provided with a function equivalent to the optical filter 71. Other configuration other than for the multiplexer 72 is the same as for the case of the aforementioned first embodiment, and hence description is here omitted.

Figure 7:
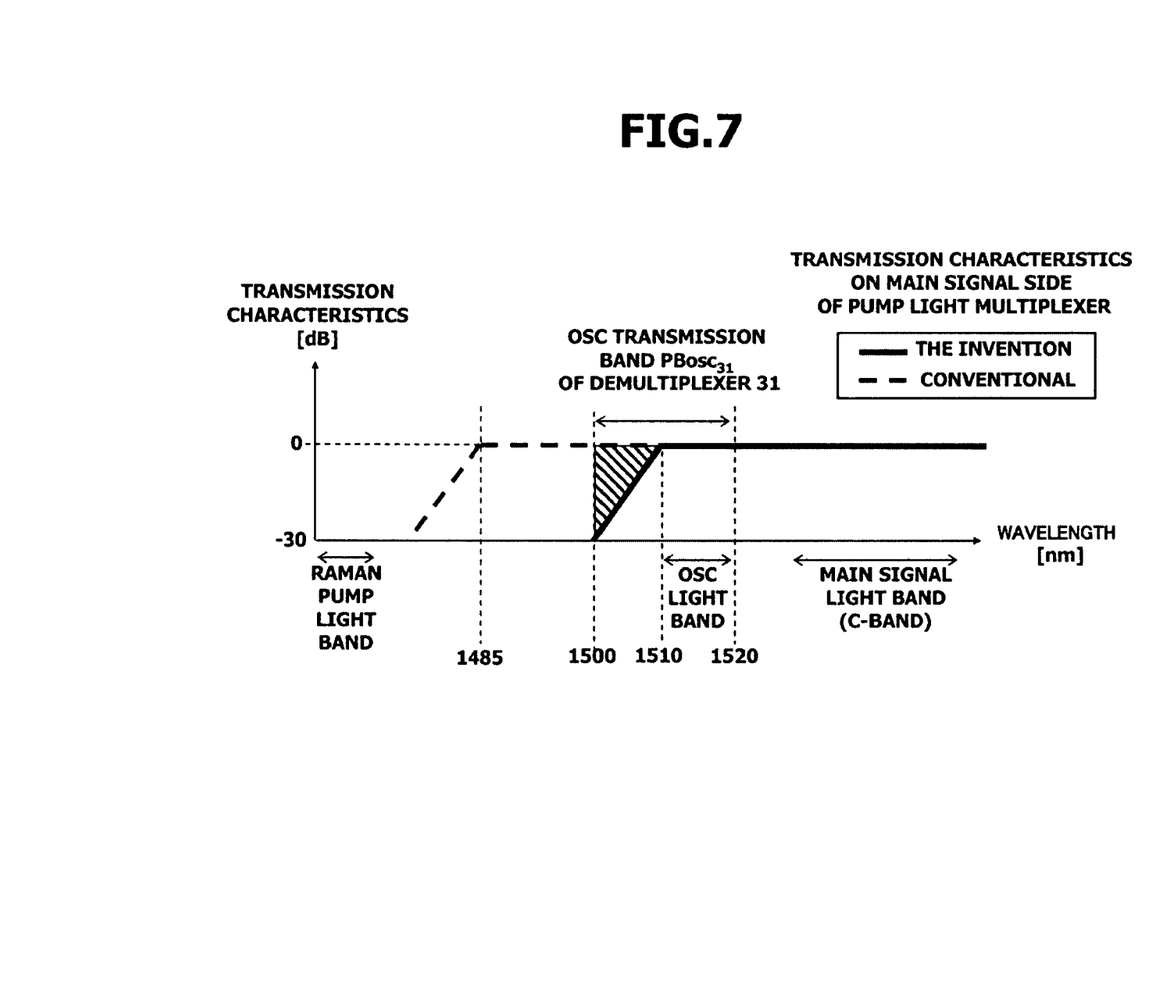
FIG. 7 is a diagram schematically showing transmission characteristics on a main signal light side of a multiplexer in the second embodiment.

Regarding the multiplexer 72, the transmission characteristics for transmitting the output light from the reception end of the transmission line 1 to the demultiplexer 31 side (hereunder transmission characteristics for the main signal light side), for example as shown by the solid line in FIG. 7, are set so that the end portion on the short wavelength side with respect to the OSC transmission band $PBosc_{31}$ of the demultiplexer 31 becomes a cutoff band (shaded portion). More specifically, in the example of FIG. 7, a case is assumed where a Raman pump light band is set in a wavelength band shifted approximately 100 nm to the short wavelength side, with respect to the main signal light band of the C-band (1530 to 1560 nm), and the OSC light band is set in a range of 1510 to 1520 nm between the Raman pump light band and the main signal light band. In this case, regarding the transmission characteristics on the main signal side of the multiplexer used in the conventional system shown by the broken line in FIG. 7, normally the shortest wavelength of the transmission band that contains both of the main signal light band and the OSC light band, is designed to be in the vicinity of 1485 nm taking into consideration the longest wavelength of the Raman pump light band. In contrast to this, regarding the transmission characteristics on the main signal side of the multiplexer 72 in this embodiment, considering that the OSC transmission band $PBosc_{31}$ of the demultiplexer 31 is in the vicinity of 1500 to 1520 nm, then the shortest wavelength of the transmission band that contains both of the main signal light band and the OSC light band is designed to be in the vicinity of the border on the short wavelength side of the OSC light band.

By the above application of the multiplexer 72, then out of the noise light input to the OSC receiver in the conventional configuration, the noise light equivalent to the shaded portion of FIG. 7 is cut off by the multiplexer 72. Consequently, similarly to the case of the aforementioned first embodiment, the total power of the noise light input to the OSC receiver 33 is reduced, and reception characteristics of the OSC light Losc are improved. Therefore it is possible to realize high dependability. In the configuration of this embodiment, the function equivalent to the optical filter 71 in the first embodiment is provided for the multiplexer 71 used for Raman pump light. Therefore countermeasures for noise light of Raman amplification can be realized with a simpler configuration.

Next is a description of a third embodiment of an optical communication system of the present invention.

In the third embodiment, an application example is described where, for the aforementioned second embodiment, the configuration of the DRA unit 50 is divided into an excitation system used for main signal light amplification and an excitation system used for OSC light amplification, so that also under circumstances where some abnormality occurs in the excitation system used for main signal light amplification, and Raman amplification of the main signal light is stopped, normal operation of OSC light can be maintained.

Figure 8:
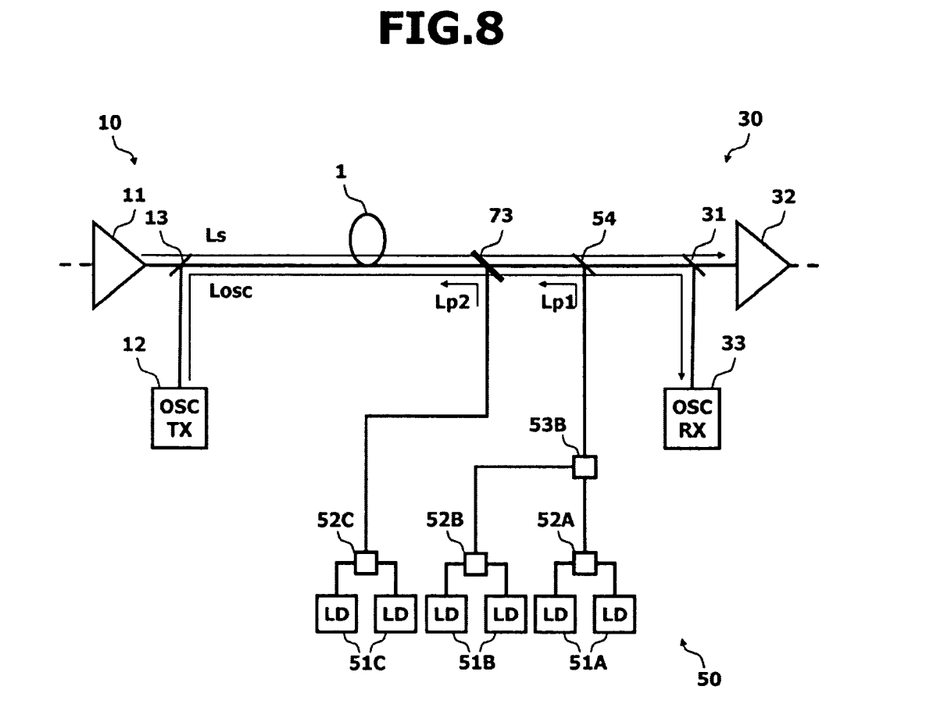
FIG. 8 is a block diagram showing a configuration of a third embodiment of an optical transmission system.

FIG. 8 is a block diagram showing a configuration example for one repeating section in the optical communication system of the third embodiment.

In FIG. 8, regarding the DRA unit 50 applied to the optical communication system of this embodiment, as the excitation system for the main signal light amplification, the output light from the pump light sources 51A and 51B is multiplexed by the multiplexers 52A, 52B and 53B, and the pump light Lp1 used for the multiplexed main signal light amplification is sent on the transmission line 1 via the multiplexer 54. Furthermore, as the excitation system used for OSC light amplification, the output light from the respective pump light sources 51C is multiplexed by the multiplexer 52C, and the pump light Lp2 used for the multiplexed OSC light amplification is sent on the transmission line 1 via the multiplexer 73. Here the multiplexer 73 on the OSC light side is arranged more on the transmission line 1 side that the multiplexer 54 on the main signal light side, and the respective pump lights Lp1 and Lp2 used for the main signal light amplification and the OSC light amplification constitute backward excitation types that propagate on the transmission line 1 in an opposite direction to the main signal light Ls and the OSC light Losc.

In the configuration as described above which is divided into two excitation systems, regarding the noise light cutoff function equivalent to the optical filter 71 in the abovementioned first embodiment, for example assuming a system upgrade where Raman amplification of OSC light is newly applied due for example to an increase in repeating loss due an increase in the long distance, then the excitation system used for OSC light amplification is increased compared to the system prior to upgrade. Therefore it is convenient to provide the aforementioned noise light cutoff function for the multiplexer 73 of the excitation system used for this OSC light amplification. Regarding the transmission characteristics of the multiplexer 73, these are designed taking into consideration the OSC transmission band $PBosc_{31}$ of the demultiplexer 31, and so that a transmission characteristics for example as shown in FIG. 9, corresponding to the relationship of the arrangement for the multiplexer 54 is realized.

Figure 9:
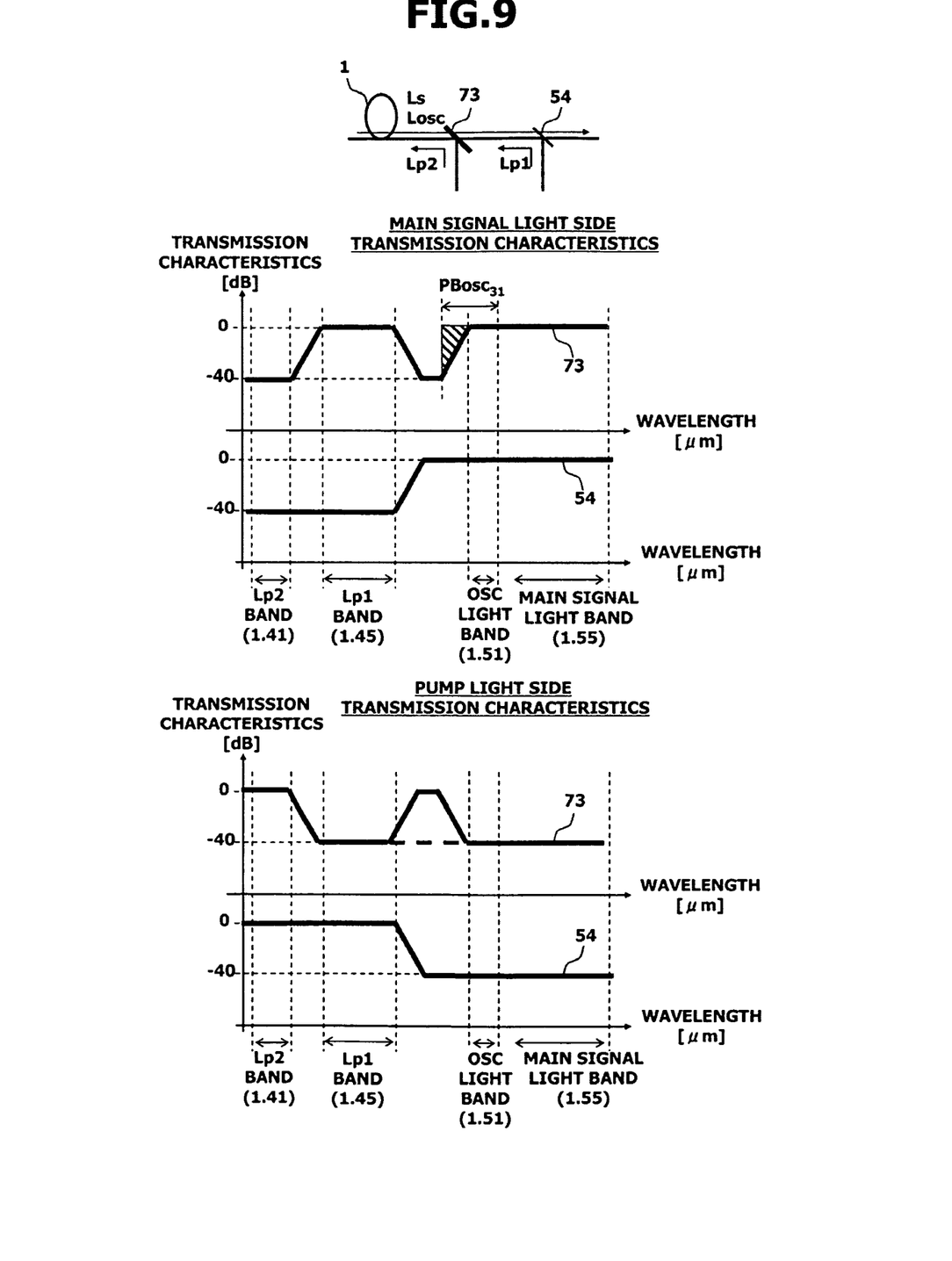
FIG. 9 is a diagram schematically showing transmission characteristics of a pump light multiplexer in the third embodiment.

More specifically, at the top of FIG. 9, the positional relationship for the transmission line 1 and the multiplexers 73 and 54 is selected for illustration. Furthermore, in the center of FIG. 9, the transmission characteristics on the main signal light side for the multiplexers 73 and 54 (the transmission characteristics for where the output light from the reception end side of the transmission line 1 is transmitted to the multiplexer 31 side) are shown. Moreover at the bottom of FIG. 9, the transmission characteristics on the excitation side for the multiplexers 73 and 54 (the transmission characteristics for where the output light from the pump light source side is transmitted to the transmission line 1 side) are shown.

For the multiplexer 73 of the excitation system used for OSC light amplification, regarding the transmission characteristics on the main signal side (upper side at the center in FIG. 9), the shortest wavelength of the transmission band that contains both of the main signal light band and the OSC light band is designed so that, with respect to the OSC transmission band $PBosc_{31}$ of the demultiplexer 31, the end portion on the short wavelength side becomes the cutoff band (shaded portion). Furthermore, so that the pump light Lp1 used for the main signal light amplification supplied via the multiplexer 54 is sent to the transmission line 1 side, a transmission band is also formed corresponding to the wavelength band of the pump light Lp1. For the transmission characteristics on the excitation side of the multiplexer 73 (upper side at the bottom in FIG. 9), the design is performed so that a transmission band is formed corresponding to the wavelength band of the pump light Lp2 used for OSC light amplification. In the example of FIG. 9, a transmission band is also formed between the wavelength band of the pump light Lp1 and the wavelength band of the OSC light. However this transmission band, as shown by the dashed line in the figure, need not specifically be provided.

On the other hand, in the multiplexer 54 of the excitation system used for the main signal light amplification, regarding the transmission characteristics on the main signal side (lower side at the center in FIG. 9), the shortest wavelength of the transmission band that contains both of the main signal light band and the OSC light band is designed to the longest wavelength of the wavelength band in consideration of the wavelength band of the pump light Lp1. Furthermore, for the transmission characteristics on the excitation side (lower side at the bottom in FIG. 9), the design is performed so that a transmission band is formed corresponding to the wavelength band of the pump light Lp1 (here for simplification of the configuration, a transmission band that contains the wavelength bands of the respective pump lights Lp1 and Lp2).

In the optical communication system of the third embodiment, by the above application of the multiplexer 73 having a transmission function as described above, then out of the noise light input to the OSC receiver in the conventional configuration, the noise light equivalent to the shaded portion on the upper side at the center in FIG. 9, is cut off by the multiplexer 73. Consequently, similarly to the case of the aforementioned second embodiment, the total power of the noise light input to the OSC receiver 33 is reduced, and reception characteristics of the OSC light Losc are improved. Therefore it is possible to realize high dependability. Furthermore in the configuration of this embodiment, the excitation system used for OSC light amplification is made a separate system to that used for main signal light amplification. Therefore even if an abnormality occurs in the excitation system used for main signal light amplification, normal operation of the OSC light can be maintained, and the failure factor can be quickly specified, so that early error recovery is possible. Consequently, the dependability of the optical communication system can be further improved.

In this third embodiment, an example has been described where the multiplexer 73 on the OSC light side is arranged further to the transmission line side than the multiplexer 54 on the main signal light side. However in contrast to this, it is also possible to have a configuration where the multiplexer 54 on the main signal light side is arranged further to the transmission line 1 side than the multiplexer 73 on the OSC light side.

Figure 10:
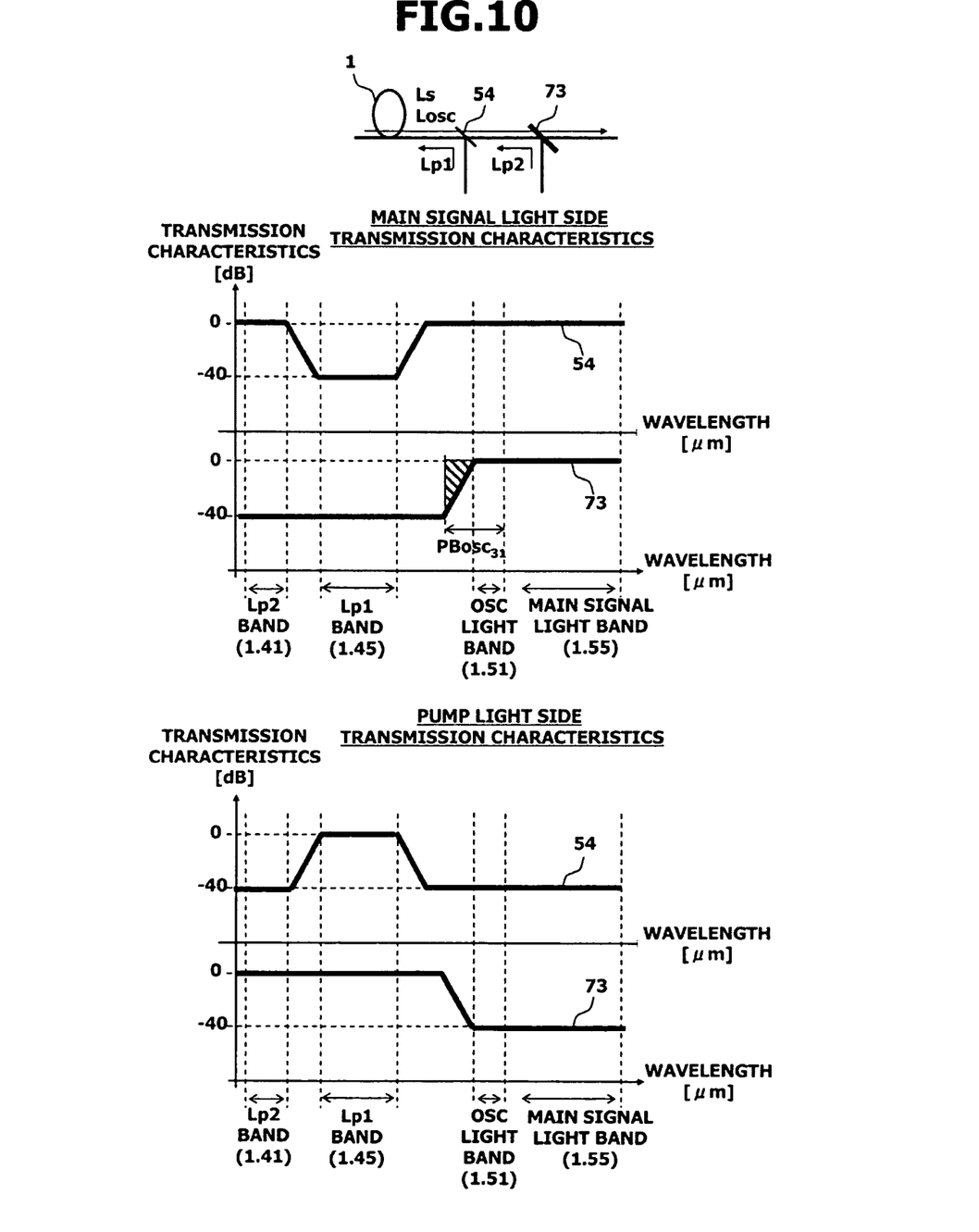
FIG. 10 is a diagram schematically showing transmission characteristics of a pump light multiplexer in another configuration related to the third embodiment.

FIG. 10 is an example of transmission characteristics of the multiplexers 54 and 73 for the case where the above arrangement is applied. More specifically, for the multiplexer 54 of the excitation system used for the main signal light amplification, regarding the transmission characteristics on the main signal side (upper side at the middle in FIG. 10), the shortest wavelength of the transmission band that contains both the main signal light band and the OSC light band is designed to the longest wavelength of the wavelength band, in consideration of the wavelength band of the pump light Lp1. Furthermore, so that the pump light Lp2 used for the OSC light amplification supplied via the multiplexer 73 is sent to the transmission line 1 side, the transmission band is also formed corresponding to the wavelength band of the pump light Lp2. For the transmission characteristics on the excitation side of the multiplexer 54 (upper side at the bottom in FIG. 10), the design is performed so that a transmission band is formed corresponding to the wavelength band of the pump light Lp1 used for main signal light amplification.

On the other hand for the multiplexer 73 of the excitation system used for OSC light amplification, regarding the transmission characteristics on the main signal side (lower side at the center in FIG. 10), the shortest wavelength of the transmission band that contains both of the main signal light band and the OSC light band is designed so that, with respect to the OSC transmission band PBosc$_{31}$ of the demultiplexer 31, the end portion on the short wavelength side becomes the cutoff band (shaded portion). Furthermore for the transmission characteristics on the excitation side (lower side at the bottom in FIG. 10), the design is performed so that a transmission band is formed corresponding to the wavelength band of the pump light Lp2 (here for simplification of the configuration, a transmission band that contains the wavelength bands of the respective pump lights Lp1 and Lp2).

Furthermore, in the above mentioned first through third embodiments, the configuration example is shown of a backward direction excitation type where the Raman amplification pump light is propagated on the transmission line in an opposite direction to the main signal light (OSC light). However the present invention is also applicable to a configuration of a forward excitation type where the Raman amplification pump light is propagated on the transmission line in a same direction to the main signal light (OSC light), and to a configuration of a bi-direction excitation type where these are combined together.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
a demultiplexer into which is input light output from a reception end of a transmission line that propagates main signal light and optical supervisory channel light that is different from the main signal light while Raman amplifying each of the main signal light and the optical supervisory channel light, and that has a predetermined transmission band centered on a wavelength of the optical supervisory channel light, and that demultiplexes the optical supervisory channel light with noise light generated by Raman amplification in the transmission line from the input light in accordance with the transmission band, and
an optical supervisory channel light receiver that receives the optical supervisory channel light that has been demultiplexed by the demultiplexer,
wherein there is provided a noise light cutoff section arranged on an optical path between the reception end of the transmission line and the demultiplexer or an optical path between the demultiplexer and the optical supervisory channel light receiver, that passes the main signal light and the optical supervisory channel light, and cuts off noise light included in at least one end portion band on a short wavelength side and a long wavelength side of the transmission band, out of the noise light corresponding to the transmission band of the demultiplexer.

2. An optical transmission apparatus according to claim 1, wherein the noise light cut off section cuts off noise light contained in an end portion band on a side where the total power of the noise light in a unit wavelength band is relatively large, out of respective end portion bands on the short wavelength side and the long wavelength side.

3. An optical transmission apparatus according to claim 1, wherein the noise light cutoff section cuts off noise light contained in end portion bands on both the short wavelength side and the long wavelength side.

4. An optical transmission apparatus according to claim 1, wherein the noise light cutoff section is an optical filter that is inserted on an optical path between a reception end of the transmission line and the demultiplexer.

5. An optical transmission apparatus according to claim 1, wherein the noise light cut off section is an optical filter inserted on an optical path between the demultiplexer and the optical supervisory channel light receiver.

6. An optical transmission apparatus according to claim 1, wherein there is provided
a Raman pump light supply section having a pump light source that generates pump light capable of Raman amplifying the main signal light and the optical supervisory channel light in an amplification medium on the transmission line, and a multiplexer that supplies pump light output from the pump light source onto the transmission line from a reception end of the transmission line,
and the transmission characteristics on the main signal side of the multiplexer are such as to pass the main signal light and the optical supervisory channel light, and cut off noise light contained in at least one end portion band on a short wavelength side and a long wavelength side of the transmission band, out of the noise light corresponding to the transmission band of the demultiplexer.

7. An optical transmission apparatus according to claim 6, wherein the Raman pump light supply section has a first pump light source that generates pump light capable of Raman amplifying the main signal light, and a first multiplexer that supplies pump light output from the first pump light source onto the transmission line, and a second pump light source that generates pump light capable of Raman amplifying the optical supervisory channel light, and a second multiplexer that supplies pump light output from the second pump light source onto the transmission line.

8. An optical transmission apparatus according to claim 7, wherein the transmission characteristics on the main signal side of the second multiplexer are such as to pass the main signal light and the optical supervisory channel light, and cut off noise light contained in at least one end portion band on a short wavelength side and a long wavelength side of the transmission band, out of the pump light corresponding to the transmission band of the demultiplexer.

9. An optical transmission apparatus according to claim 8, wherein the second multiplexer is arranged further on a reception end side of the transmission line than the first multiplexer.

10. An optical transmission apparatus according to claim 8, wherein the first multiplexer is arranged further on a reception end side of the transmission line than the second multiplexer.

11. An optical transmission apparatus according to claim 1, wherein the optical supervisory channel light receiver contains an avalanche photodiode.

12. An optical communication system that repeatedly transmits main signal light by means of a plurality of optical transmission apparatuses provided on a transmission line, and transmits and receives optical supervisory channel light that is different from the main signal light, between the optical transmission apparatuses of respective repeating sections to transmit system information, wherein
an optical transmission apparatus according to claim 1 is provided on a reception side of the respective repeating sections.

* * * * *